United States Patent
Harrison et al.

(10) Patent No.: US 7,742,689 B2
(45) Date of Patent: Jun. 22, 2010

(54) LIQUID HEATING APPARATUS AND METHOD

(75) Inventors: Michael Harrison, Chester (GB); John Collins, Chester (GB); Andrew Rowley, Nantwich (GB)

(73) Assignee: C-Tech Innovation Limited, Chester (GB)

( * ) Notice: Subject to any disclaimer, the term of this patent is extended or adjusted under 35 U.S.C. 154(b) by 1017 days.

(21) Appl. No.: 10/585,273

(22) PCT Filed: Dec. 7, 2004

(86) PCT No.: PCT/GB2004/005144

§ 371 (c)(1),
(2), (4) Date: Jul. 6, 2006

(87) PCT Pub. No.: WO2005/066551

PCT Pub. Date: Jul. 21, 2005

(65) Prior Publication Data

US 2007/0154193 A1    Jul. 5, 2007

(30) Foreign Application Priority Data

Jan. 7, 2004    (GB)    ................... 0400206.9

(51) Int. Cl.
*H05B 3/60* (2006.01)
(52) U.S. Cl. .................. 392/314; 392/329
(58) Field of Classification Search .......... 392/311–338
See application file for complete search history.

(56) References Cited

U.S. PATENT DOCUMENTS

| | | | | |
|---|---|---|---|---|
| 612,474 A | * | 10/1898 | Yoas | |
| 1,476,080 A | * | 12/1923 | Kaelin | 392/325 |
| 1,553,491 A | * | 9/1925 | Werner | 392/322 |
| 1,950,511 A | * | 3/1934 | Noll | 392/328 |
| 2,152,122 A | * | 3/1939 | Wilcox | 99/306 |
| 3,020,385 A | * | 2/1962 | Conlin et al. | 392/334 |
| 4,418,269 A | * | 11/1983 | Eaton-Williams | 392/326 |
| 4,633,066 A | * | 12/1986 | Chang | 219/437 |
| 4,692,591 A | * | 9/1987 | Cooley et al. | 392/312 |
| 5,245,691 A | * | 9/1993 | Wu | 392/365 |
| 5,363,471 A | * | 11/1994 | Jones | 392/325 |
| 5,805,767 A | * | 9/1998 | Jouas et al. | 392/373 |
| 6,124,574 A | * | 9/2000 | Knepler | 219/447.1 |
| 6,365,881 B1 | * | 4/2002 | Itzhak | 219/481 |
| 6,437,300 B1 | * | 8/2002 | Katzman et al. | 219/497 |
| 6,640,048 B2 | * | 10/2003 | Novotny et al. | 392/314 |

FOREIGN PATENT DOCUMENTS

| | | | |
|---|---|---|---|
| CH | 96542 | * | 3/1921 |
| DE | 2 549 562 | * | 5/1977 |
| DE | 3421 807 | * | 12/1985 |

(Continued)

*Primary Examiner*—Sang Y Paik
(74) *Attorney, Agent, or Firm*—Westman, Champlin & Kelly, P.A.

(57) ABSTRACT

The invention relates to an apparatus for heating an electrically conductive fluid, such as potable water, and to a method of heating the same. The heating apparatus includes a plurality of electrodes in an array, and a controller for selectively energizing the plurality of electrodes, in different combinations, to thereby adjust the electrical resistance observed across the electrode array, in order to maximize the current drawn by the apparatus.

31 Claims, 5 Drawing Sheets

FOREIGN PATENT DOCUMENTS

| | | | |
|---|---|---|---|
| GB | 210489 | * | 1/1924 |
| GB | 241473 | * | 10/1925 |
| GB | 249120 | * | 9/1927 |
| GB | 725568 | | 3/1955 |
| GB | 1 095 385 | * | 9/1968 |
| GB | 2 074 430 | * | 10/1981 |
| GB | 2 183 803 | * | 6/1987 |
| GB | 2 268 671 | * | 1/1994 |
| SD | 1764506 | * | 9/1992 |

* cited by examiner

LIQUID HEATING APPARATUS AND METHOD

CROSS-REFERENCE TO RELATED APPLICATION

This Application is a Section 371 National Stage Application of International Application No. GB2004/005144, filed Dec. 7, 2004 and published as WO 2005/066551 on Jul. 21, 2005 in English.

FIELD OF INVENTION

This invention relates to methods and apparatus for heating fluids, and more particularly to methods and apparatus for ohmically heating potable water using immersed electrodes.

BACKGROUND OF THE INVENTION

Kettles are well known devices for boiling water in the home and office, generally for use in preparing food and drinks for human consumption. In most cases, kettles are powered by electrical energy, since it is a clean and convenient power source. Electric kettles are currently designed to give maximum heating rates and efficiency, as well as having an appealing aesthetic appearance. The most usual way to apply electrical energy to heat water in a kettle, is via one or more resistive heating elements immersed in the water.

However, the use of heating elements to rapidly heat water gives rise to high temperature gradients between the element and the water in contact with the heating element. This, together with the fact that the heating element provides multiple nucleation points for bubble formation, leads to the creation of many small bubbles of steam, which then collapse in the bulk water to produce a noise.

Furthermore, the extreme temperature gradient present at the heating element surface results in the precipitation of minerals and other chemicals dissolved in the water. This results in both the build up of precipitates around the heating element, which reduces the heating efficiency of the heating element, and across the bottom of the kettle in general, which can result in these precipitates finding their way into the food and drinks prepared using the heated water. These are both undesirable traits in kettles according to the conventional art.

A technique known as 'ohmic heating' can also be used to heat electrically conductive fluids such as water. Ohmic heating of water allows rapid, highly efficient heating of the water. Ohmic heating provides a more uniform heating of a fluid, and also has the advantage that none of the surfaces of the heating apparatus become much hotter than the fluid. Thus the use of ohmic heating does not result in the formation of bubbles of steam throughout the majority of the heating cycle with the result that the operation of an ohmically heating kettle is virtually silent, until the full bulk of the water boils, at which time the heating operation is complete.

Arrangements are known where current is passed through a liquid to cause it to heat. In particular, document GB 2268671 discloses an ohmic heater for heating a fluid by passing electricity through it.

SUMMARY OF THE INVENTION

According to the present invention there is provided a water heater comprising at least three electrodes for immersion in the water and a controller adapted to selectively energise the electrodes in at least two different combinations.

Preferably, the heating apparatus is domestic heating apparatus for heating water in the home or office.

Preferably, the controller is adapted to energise one or more of the plurality of electrodes by activating switches separately connecting at least two of the electrodes to the power supply.

Preferably, a current detector is arranged to detect the total electrode current, and the controller is further adapted to activate said switches in dependence upon the detected current.

Preferably, the plurality of electrodes comprise a first and second group of electrodes, the first group of electrodes being connected to a first terminal of said power supply, and each of the second group of electrodes being connected to a second terminal of the power supply via a switch.

Preferably, each of the first group of electrodes is connected to the first terminal of said power supply via a switch.

Preferably, the first terminal of the power supply is a neutral terminal and the second terminal is a live terminal.

Preferably, the heater further comprises an electrically insulated vessel for containing the fluid to be heated, wherein the plurality of electrodes are spatially arranged with predetermined gaps between the plurality of electrodes, and wherein the predetermined gaps between different ones of the electrodes are different sizes.

Preferably, each different combination of electrodes results in a different total fluid resistance being observed across the electrodes.

Preferably, the controller is further adapted to increase the resistance presented between active electrodes by switching in suitable electrode pair combinations in response to a increase in the measured current and to decrease the resistance presented between active electrodes in response to a decrease in the measured current.

Preferably, the electrodes are formed from vertically extending plates.

Preferably, the electrodes are substantially parallel.

Preferably, the electrodes are formed from carbon or carbon containing media.

Preferably, the electrodes are formed from compressed exfoliated carbon.

Preferably, the electrodes are formed from a polymer and carbon mixture.

Preferably, the plurality of electrodes are arranged as a plurality of concentric rings, arranged about a central rod.

Preferably, alternate rings are from the same group of electrodes.

Preferably, alternate rings are of differing heights.

There is also provided an apparatus for heating an electrically conductive fluid, comprising at least two electrodes for immersion in the fluid.

Preferably, the apparatus further comprises a tilt switch arranged to isolate the power supply means from the plurality of electrodes when the tilt switch detects the apparatus is tilted.

Preferably, the apparatus further comprises a lid and a switch, the switch being mechanically operable by the opening of said lid, and for isolating the power supply means from said electrodes when the lid is opened.

Preferably, the apparatus further comprises a handle, said handle comprising connecting means, for connecting said switch to said power supply.

Preferably, the controller comprises a microcontroller adapted to received an input indicative of the electrode current from the current detector and to provide a controlling output to one or more of the switches, dependent on the electrode current drawn.

Preferably, the apparatus further comprises conductor located around the top of said vessel, below said lid, wherein the conductor is electrically connected to an earth line of a power supply.

Preferably, the vessel further comprising a spout and a spout covering mesh, wherein the spout covering mesh is connected to the earth of the power supply and is capable of allowing the heated water to pass through when the heating apparatus is tilted substantially off vertical.

Preferably, the switches are semiconductor switches and the controller operates said semiconductor switches using a driver circuit.

Preferably, the semiconductor switches are triacs.

Preferably, the semiconductor switches are thermally coupled to the vessel base.

Preferably, the water being heated is potable water.

There is further provided an electrode arrangement for use in heating a electrically conductive fluid, said electrode arrangement comprising a first plurality of electrodes, and a second plurality of electrodes, each activated by a switch, whereby activating different ones of the switches results in varying resistances being observed across both pluralities of electrodes.

Preferably, different ones of the electrodes are separated by different predetermined distances.

There is still further provided a method of heating domestic potable water, the method comprising immersing at least three electrodes in the fluid to be heated and selectively energising the electrodes in at least two different combinations.

Preferably, the method further comprises the steps of measuring a total electrode current and activating said switches in dependence upon said measured current.

Preferably, the method further comprises the steps of increasing the resistance presented between active electrodes by switching in suitable electrode pair combinations in response to a increase in the measured current and to decrease the resistance presented between active electrodes to a decrease in the measured current.

Preferably, the step of increasing the resistance presented between active electrodes is achieved by binary addition of the energisation of the different electrodes.

Preferably, the method further includes the step of returning to a previous combination of energised electrodes if the measured total electrode current exceeds a predetermined level.

Preferably, the method further includes the step of disconnecting the electrodes from the power supply if the current measured decreases rapidly as a result of the fluid starting boiling.

There is still further provided a domestic electric kettle for heating water, comprising a vessel for containing the water, at least three electrodes for immersion in the water contained in the vessel, and a controller adapted to selectively energise the electrodes in at least two different combinations to thereby adjust a total fluid resistance observed across the electrodes.

There is still further provided a heating device for water or other liquids, incorporating two electrodes, which are energised by connection to a single-phase (or two phases of a three phase) electrical power supply, the electrodes when energised cause current to be passed through the water causing it to be heated (due to its own electrical resistivity), the passage of this electrical current causes the water to be heated but without the formation of bubbles which lead to noise generation, thus a rapid and silent kettle.

There is still further provided a method of operating an ohmically heated silent kettle, wherein the current between electrodes 2 and 3 can be varied by the adjustment of the separation of said electrodes to tune the kettle for optimum performance There is still further provided a method of operating an ohmically heated silent kettle, wherein the current between electrodes 2 and 3 can be varied by the adjustment of the area of said electrodes to tune the kettle for optimum performance There is still further provided a method of operating an ohmically heated silent kettle, wherein the current between electrodes 2 and 3 can be varied by electronic monitoring and control techniques to tune the kettle for optimum performance There is still further provided an ohmically heated silent kettle, wherein said vessel is electrically insulating There is still further provided a silent heating technique which could be employed for heating water (and other liquids) in equipment such as in-line water heaters, coffee machines and showers.

There is still further provided a silent heating technique for heating water causes the heating of the water without the formation of precipitates ('furring').

Preferably the water being heated is potable water, for use in making foods or drinks for human consumption.

Preferably the water heating apparatus will be for use in consumer devices.

Alternatively, the water heating apparatus may be for use catering, for example, for use in a catering sized water heating apparatus.

The current is preferably measured by means of a wire loop positioned around the conductor carrying the power supply current. However, this current may equally be measured using a fixed resistor in series with the conductor carrying the power supply current, with a voltage detector connected across the fixed resistance to measure the current using the equation I=V/R. Further ways to measure the current may equally be applied, such as the use of Hall Effect/magnetic probes.

By heating water ohmically and using a controller which maximises the current drawn by the heating apparatus, up to the maximum current the power supply can deliver, the water is heated at the fastest possible rate. Furthermore, the direct heating of the water is more efficient than the standard heat conduction method used in kettles as known previously, since in the previously known method, energy is required to heat up the heating element itself, as well as the water.

The passage of this electrical current causes the water to be heated but without the formation of bubbles which lead to noise generation. Thus the device according to the present invention can heat water both more rapidly, and with less noise generated, than a device according the to prior art.

Furthermore, as the fluid is heated directly by the passage of electricity through it and not by heat transfer from a hot surface, 'furring', i.e. the formation of precipitates, will occur to a lesser extent in the device of the present invention, since such furring tends to only occur at the high surface temperatures gradients seen when using submerged heating elements.

With the electrodes arranged as vertically extending plates with gaps between them, if the kettle is allowed to boil dry, once enough water has been boiled off to no longer form an electrical circuit between the electrodes, the kettle will no longer draw any current and thus no damage to the kettle or electrodes will occur.

Whilst embodiments are described in terms of using triac semiconductor switches to energise the electrodes, it will also be apparent to those skilled in the art that equivalent devices such as thyristors, MOSFETS, Insulated Gate Bipolar Transistors (IGBTs) and contact relays or other similar switching devices may also be used in the present invention.

BRIEF DESCRIPTION OF THE DRAWINGS

The present invention may be put into practice in a number of different ways. Embodiments will now be described by way of example only, and with reference to the accompanying drawings, in which.

DETAILED DESCRIPTION OF THE PREFERRED EMBODIMENT

Figure 1:
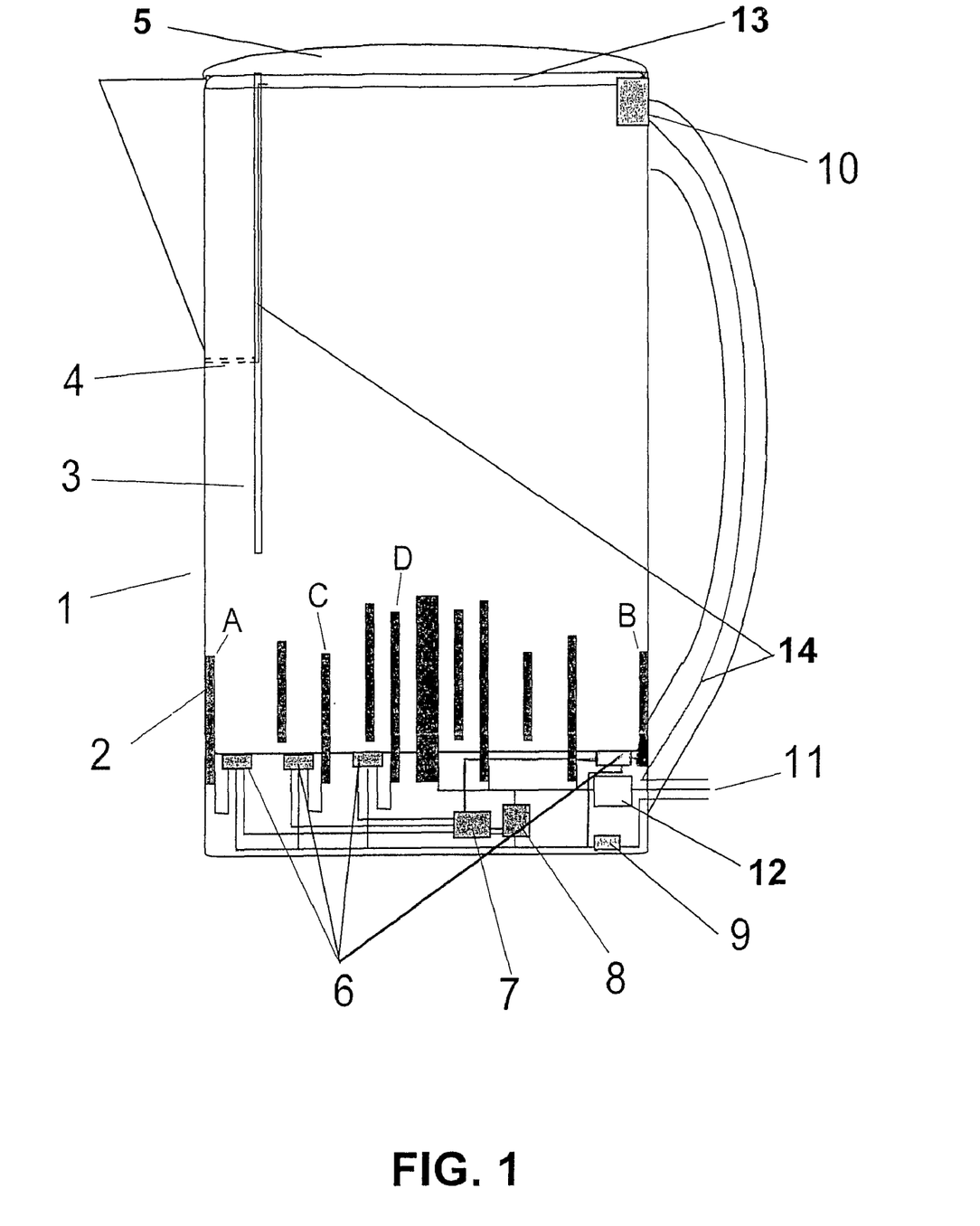
FIG. 1 shows a schematic cross section through one embodiment of a kettle according to the present invention, including the electrodes, control system, and protection systems.

Referring now to FIG. 1, there is shown a preferred embodiment of the present invention, in which the electrodes 2 are arranged across the bottom of a vessel 1 for containing a fluid to be heated in the form of concentric rings formed from substantially vertical plates and with the neutral and live electrodes being arranged alternately.

The kettle 1 is designed to be connected to a standard single phase AC electrical mains supply 11, as is commonly found in the home or office. Such AC electrical supplies 11 generally consist of at least a live and neutral line, with some countries, for example the UK, also providing an earth line for safety. In the preferred embodiment described below, the example of a UK standard AC supply is used.

The kettle 1 of the present invention is designed, during normal operation, to operate at the limit of the domestic AC electrical supply 11 being used to power the kettle 1. For example, in the UK, these limits are 230 Volts and 13 Amps.

The kettle 1 comprises a main vessel including a handle, a plurality of electrodes 2 to transfer the electrical power to the water, an internal spout divider 3, an earth mesh 4, a lid 5, a plurality of semiconductor switches 6, an electrode energisation control circuit 7, an AC to DC converter 8, a current sensor 9, a lid interlock 10, a AC power supply connection 11, a tilt switch 12, a lid earth strip 13 and earth line 14.

The kettle vessel 1 is constructed from a suitable electrically insulating material, for example a thermoset plastic, polymer or ceramic, or a conductive material with an insulating coating, and must be of such a wall thickness as to adequately withstand the internal temperatures that will occur during the heating of the water, especially when the water boils.

The electrodes 2 comprise a number of neutral electrodes, commonly connected to the neutral line of the AC power supply, and a number of live electrodes, connected to the live line of the power supply 11 via a number of semiconductor switches 6. These switches enable different live electrodes to be energised independently, to thereby allow control of the total electrical resistance between the live and neutral electrodes, which would otherwise be solely dependent on the level and conductivity of the water being heated.

In an alternative embodiment, the neutral electrodes are also each connected to the neutral line of the AC power supply via a semiconductor switch. This has the advantage of providing more combinations of switched on electrodes 2, therefore providing a greater number of resistances that can be observed across the electrode array. This, in turn, allows the current drawn by the kettle to be more closely matched to the maximum rating, therefore minimising the time taken to heat the water.

The electrodes 2 are constructed from a suitable material, chosen so as to minimise their corrosion during normal operation of the kettle 1, and also to minimise any electrochemical effects which may occur during the heating process. The electrodes 2 must also be made from material that is compatible with the chemical and electrochemical properties of the fluid to be heated.

In general there will be an upper limit to the current density which any particular electrode material will withstand without damaging the current carrying portion of the electrode or causing the water to react at the electrode surface and adversely affect the operation of the kettle 1. Furthermore, the electrodes 2 should be formed from materials suitable for use in heating water that is for human consumption.

Suitable electrode materials have been found to be platinized titanium and various graphite based materials, including compressed exfoliated carbon or a carbon/polymer mixture, but other materials may also be chosen such as steel, stainless steel and titanium.

In the preferred embodiment, the electrodes are all formed from compressed exfoliated carbon or from an injection moulded carbon and polymer mix, with the electrical connections being formed from a suitable metal, such as copper, these connections being compressed into the electrode during manufacture or added after manufacture of the electrode. The finished electrodes 2 are then passed through a suitable electrically insulating base material, such as polymer, glass or ceramic, with seals used to prevent heated water from escaping through to the electrical circuit area located below.

The electrode array is made with gaps in the electrodes as well as between the different electrodes, which provide pathways for movement of the water that is being heated, which are sufficient to ensure the water is spread uniformly between the electrodes, and to allow the water to convect out from between the electrodes by convection currents initiated by heating of the water. This ensures that heated water mixes sufficiently with the unheated water, thereby ensuring a more even heating of the water and making operation of the kettle silent throughout the majority of the heating cycle.

The electrodes may also be formed such that there are further gaps between the bottom of the kettle and the bottom of each electrodes, thereby providing further routes by which the water being heated may mix.

The electrodes are also separated from each other by predetermined distances. Depending on the size of the separation distances between the electrodes, for any given conductivity of the water being heated, different electrical resistances will be observed across the electrodes.

By providing adequate means for the fluid to mix while being heated, the fluid will generally rise in temperature uniformly, and will typically only start to boil once the bulk of the liquid has reached its boiling point. No hot surfaces are involved in the heating process as in conventional kettles and thus the point boiling caused by such hot surfaces in conventional kettles will not occur. Accordingly, the generation of noise by means of steam bubble formation will only occur once the bulk of the fluid starts to boil, therefore the device according to the present invention is virtually silent up to this point when all the fluid contained within the vessel 1 is boiling.

The dimensions of the electrodes 2 and their spacing also needs to be chosen in such a way as to limit the currents flowing through them to levels which the electrode and water combination can withstand. The method of calculating the required separations is discussed below, with reference to FIG. 2.

Critical factors relating to the mounting of the electrodes include that they are kept parallel to each other, are at the correct separation and are arranged in such a way as to promote the flow of water through the electrode array.

The kettle 1 includes an internal spout divider 3. This may be made from the same electrically insulating material as the main vessel 1, for example polymer, and can either be an integral part of the main vessel 1, produced using a single mould, else it can be made separately and attached to the main vessel while it is in use.

The kettle 1 also includes a combined earthing mesh and filter 4, situated across the output of the kettle spout. In addition to its role as a filter for removing debris, for example, any precipitates that have formed during the heating process, this filter also acts as a barrier to prevent accidental contact of the operator with the electrodes 2. Furthermore, the filter 4 may be formed from a conductive material and electrically connected to the earth line 14, if present, to form a further electrical barrier to prevent accidental leakage of electricity through the water and into the user.

The lid 5 is interlocked 10 with the main power supply to prevent accidental contact of the operator with the electrodes within the kettle, by isolating the electricity supply or simply preventing the controller from energising any of the electrodes, should the lid 5 be opened during use. The lid 5 also helps to contain any steam produced during the heating and boiling process, and prevents a full kettle from spilling water over the surface it is placed on. The lid also may further include an earth strip 13, located around the rim of the lid 5, which is electrically connected to the earth line 14 provided by some domestic AC power supplies 11, such as in the UK.

The handle is used, as expected, to lift or hold the kettle and to pour the contents out of the kettle after it has boiled. However, it has the further use of providing space to route the wiring required to connect the lid interlock to the power supply, and the earth line 14 to be connected to the filter 4 and the earth strip 13 located around the rim of the lid 5.

The semiconductor switches 6 used to connect the live or neutral electrodes to the live or neutral line of the AC supply 11, may be of any suitable type for the purpose. In particular, the semiconductor switches 6 must be capable of handling the large load power requirements. In the preferred embodiment, these semiconductor switches 6 are triacs, such as SGS Thompson BTA16B triacs. Alternatively, high power contact relays, MOSFETS, thyristors or IGBTs may be used instead.

The triacs 6 are connected to the live or neutral electrodes by suitable connections means. For example, copper wiring connecting the triac terminals to copper connectors that have been embedded within the carbon electrodes, during their manufacture. During operation, the triacs 6 will heat up, and may require cooling to prevent destruction due to thermal runaway. In the preferred embodiment, since triacs can typically operate up to 140° C. or more, the triacs 6 are thermally coupled to the base of the kettle 1, where the heat created by the switching of the triacs can be passed through to the water being heated. This has the benefit of reducing the time taken to heat the water, and improves the efficiency of the kettle 1, by recycling otherwise wasted heat.

The electrical conductivity of potable water varies across different regions and countries, depending on what minerals and other chemicals are dissolved in the water. For example, the water sourced from a very chalky areas will have a high carbonate content and will be relatively highly conductive.

To accommodate these variations in the conductivity of the water being heated, tuning of the kettle 1 is required to ensure that the kettle 1 operates close to, but not above a maximum power level. This tuning involves altering the total electrical resistance of the electrode array to keep the resistance at or above a threshold value. This lower threshold value is arranged to correspond to the maximum power output of the electrical power supply being used to power the kettle 1, or possibly a lower maximum power rating of the kettle 1 itself.

The tuning of the kettle 1 involves two distinct stages. The first stage is planning the size and shape of the electrodes to ensure that the range of fluid conductivity and fluid level expected can be accommodated by the kettle. This stage is carried out during the design of the kettle.

The second tuning stage is carried out during the actual heating of the fluid. This stage involves adjusting the resistance of the electrode array 2 while heating occurs, by switching different live electrodes on and off in various combinations. In the preferred embodiment, this second stage tuning is carried out electronically, using the controller 7.

In another alternative embodiment, the neutral electrodes may also be switched in or out to provide an increased range of electrical resistances observable across the electrodes 2.

Figure 2:
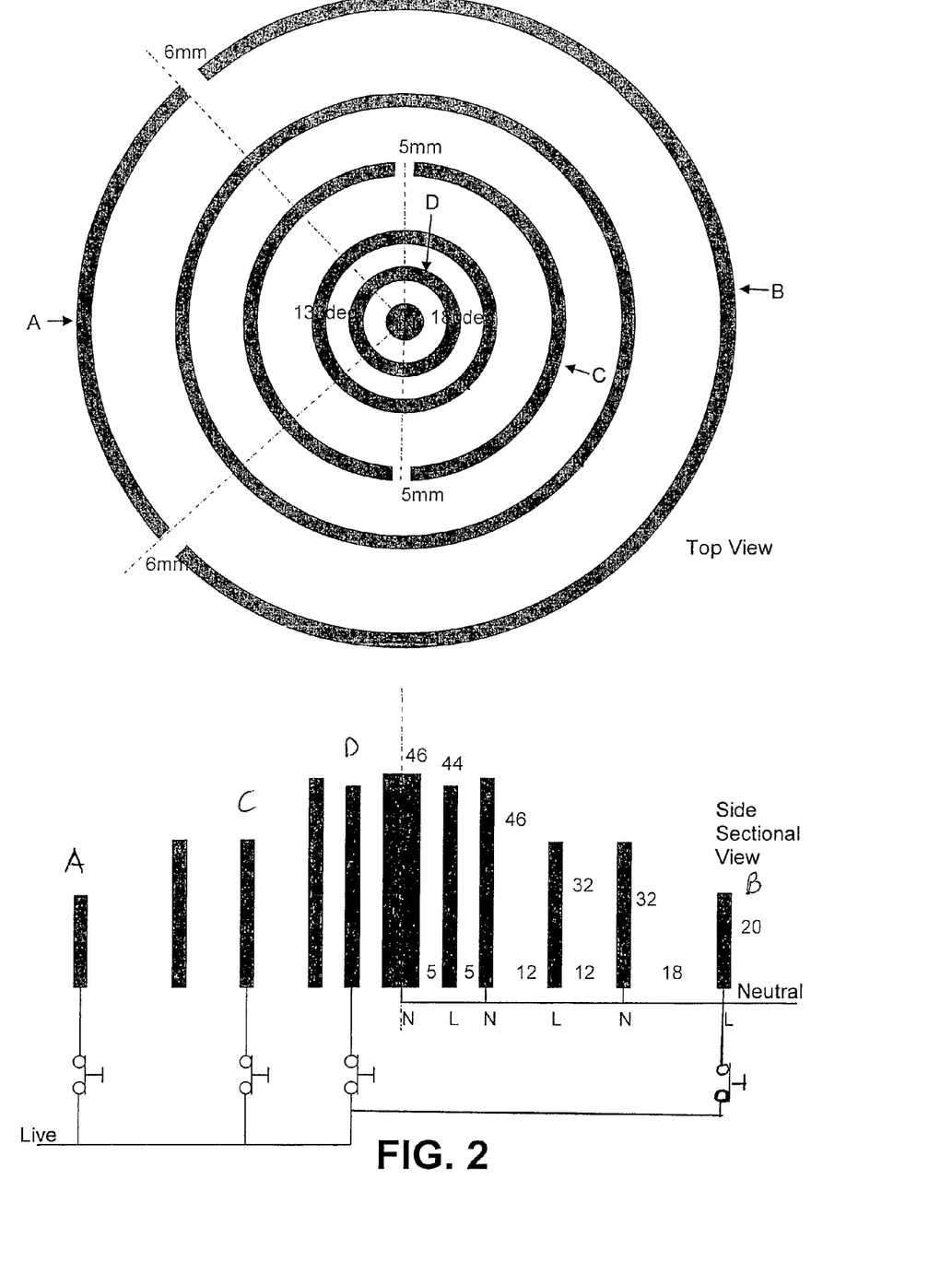
FIG. 2 shows a more detailed view of the electrode arrangement of FIG. 1, including plan and side views.

FIG. 2 shows one embodiment of a suitable electrode arrangement, with views from both the top and side. In this embodiment, the electrodes are arranged in vertical concentric rings, with the neutral and live electrodes being alternate rings. The number of rings chosen will determine the number of switching devices used to control the live electrodes.

The shape and spacing between the electrodes forming the electrode array can take many forms. However, the form chosen for the array should adhere to a number of design constraints. These constraints include:

The electrodes need to be placed sufficiently far apart to allow the heated water to convect out from between the electrodes 2 to prevent point boiling occurring. Sufficient movement of water also has the benefit of reducing the amount of precipitates formed during heating of the water.

The electrodes 2 also need to have sufficient surface area to cover the whole range of fluid conductivities likely to be encountered during normal use. This is to ensure that a sufficient heating rate is obtained for low conductivity water and that current density through any electrode never exceeds design levels, which in the preferred embodiment is approximately $1500A/m^2$. The control system employed (i.e. use of semiconductor switches controlled by a logic chip, would ensure that at no point will there be too high a current drawn on the AC mains power supply. Electrical trip circuitry can also be included as a failsafe, should the fluid being heated happen to present a conductivity outside the range of conductivities the kettle has been designed for.

The electrode areas must be sufficient to ensure that any electrochemical effects are minimised, and that the current density experienced by the electrodes 2 during use is below the maximum the material being used to form the electrodes 2 can safely withstand over long periods.

The electrodes 2 must be able to fit into the size vessel.

In operation, the different live and neutral electrodes are switched on and off to provide the different resistances required to ensure the kettle does not draw too much current.

In general, if the conductivity of the fluid is high, then those electrodes 2 spaced furthest apart will be used whilst if the conductivity of the fluid is low, those electrodes 2 spaced nearer together will be used instead. Of course, various other combinations of electrodes 2 are possible when heating water with conductivity between the maximum and minimum levels. For example, multiple electrodes may also be switched on to provide a middle of the range resistance across the electrode array.

The resistance observed across the electrodes 2 is dependent on the conductivity of the fluid being heated and the ratio of electrode separation to electrode area. Furthermore, the ratio of electrode separation to electrode area is varied by turning on or off different live (and/or neutral, in an alternative embodiment) electrodes 2.

When designing a kettle 1 according to the present invention, the designer must decide what range of fluid conductivities the kettle 1 will be able to cope with and how many resistance step changes should be available. The number of step changes is dependent on the number of switchable live (or neutral) electrodes being used. The more step changes available, then the closer to the maximum power level of the AC power supply the kettle can be operated at. It is also important to have a comprehensive range of electrode resistivities, which are capable of covering all the fluid conductivities likely to be encountered during use of the kettle 1.

An example of a typical range of fluid conductivities for domestic water supplies is 0.001 Siemens/m to 0.25 Siemens/m. A suitable number of live electrodes will typically be between 3 and 6, requiring 3 to 6 accompanying triacs.

Taking the example of a typical UK AC mains supply of 230V, which is rated at up to 13A, together with the above fluid conductivities, and making use of 3 switching live electrodes only, the following calculations can be used:

$$R_{min} = V/I = 230/13 = 17.69 \text{ Ohms}$$

Where $R_{min}$ is the minimum resistance required to ensure that the kettle 1 does not draw more than 13A. This is the resistance that the kettle 1 is ideally trying to maintain across the electrodes 2, to ensure maximum heating effect. However, the kettle 1 cannot always operate at maximum power, so we allow for a possible power reduction, for example 20%. This results in a desired maximum resistance of:

$$R_{max} = R_{min} * 1.2 = 17.69 * 1.2 = 21.23 \text{ Ohms}$$

When the fluid conductivity is at its highest, the minimum allowable ratio of electrode separation to electrode area can be calculated using the equation below:

$$\text{Ratio} = R_{min} * \text{Fluid conductivity} = 17.69 * 0.25 = 4.42$$

From the above calculated ratio of electrode separation to electrode area, the lowest conductivity of fluid that can be processed can be calculated using the equation:

$$\text{Lowest conductivity} = \text{Ratio}/R_{max} = 4.42/21.23 = 0.21.$$

The separation calculated above applies for the first switched electrode option, where only a single live electrode is in use. By repeating the above calculations using different values for the fluid conductivity, the required ratios of electrode separation to electrode area can be calculated for each switched electrode option. Also, by using the lowest conductivity of the previous switched electrode option as the highest for the next switched electrode option, the full range of fluid conductivities can be catered for.

Once all the electrode separation to electrode area ratios are known, the actual separations and areas can be calculated, with reference to the size of electrode array capable of being fitted within a kettle 1 of normal size.

When deciding on the size and shape of each electrode, to match the above calculations, it is important to ensure that the current density does not exceed the limiting value for the chosen electrode material in water above which electrochemical effects become problematic ($\sim 1500 A/m^2$). This current density limiting value can be increased for a given material by roughening the surface. For example, using the compressed carbon electrode material gives a preferred maximum current density of $1500 A/m^2$, although for highly conductive fluids it can reach up to $\sim 2500 A/m^2$.

In the preferred embodiment, the electrodes 2 are concentric rings or segments of rings, arranged around a central rod, with the ring height generally increasing towards the centre. Each concentric ring is alternate in polarity to the rings or rod located inside and outside of it, i.e. the central rod is neutral, with the ring arranged around the central rod being live, and the next ring out being neutral again, and so on.

In the preferred embodiment, the carbon electrodes 2 are set to be 3 mm in thickness, except for the central neutral electrode rod, which is set to be 8 mm in diameter.

The heights of the rings (or ring segments) and the separations between them are calculated using the above process, whilst ensuring the whole electrode arrangement can be fitted into the space allowed for a standard kettle 1 footprint. In the preferred embodiment, this results in the first outer live ring segment having a height of 20 mm and being a 138 degree segment of the whole outer ring, and at a separation of 18 mm from the first neutral electrode ring, located further in towards the centre. The second live ring is the other segment of the outer ring (being a 215 degree segment). The first neutral ring is set at a height of 32 mm, and spaced 12 mm from the third live electrode ring, located still further in towards the centre, which is also 32 mm in height. The next, i.e. second neutral electrode, further in towards the centre again, is also spaced 12 mm from the second live electrode, but has a height of 46 mm. The fourth live electrode is 44 mm in height and located between the second neutral electrode and the third neutral electrode, which is the central rod, and this fourth live electrode is separated from both neutral electrodes either side of it by 5 mm.

The electrodes 2 of the preferred embodiment also include some gaps within the live and neutral rings, to allow for free movement of water between the different spaces between the electrodes. This aids the heating process, by allowing routes for convection currents to move along, as well as allowing the water to be evenly distributed across the heating area available.

Figure 3A:
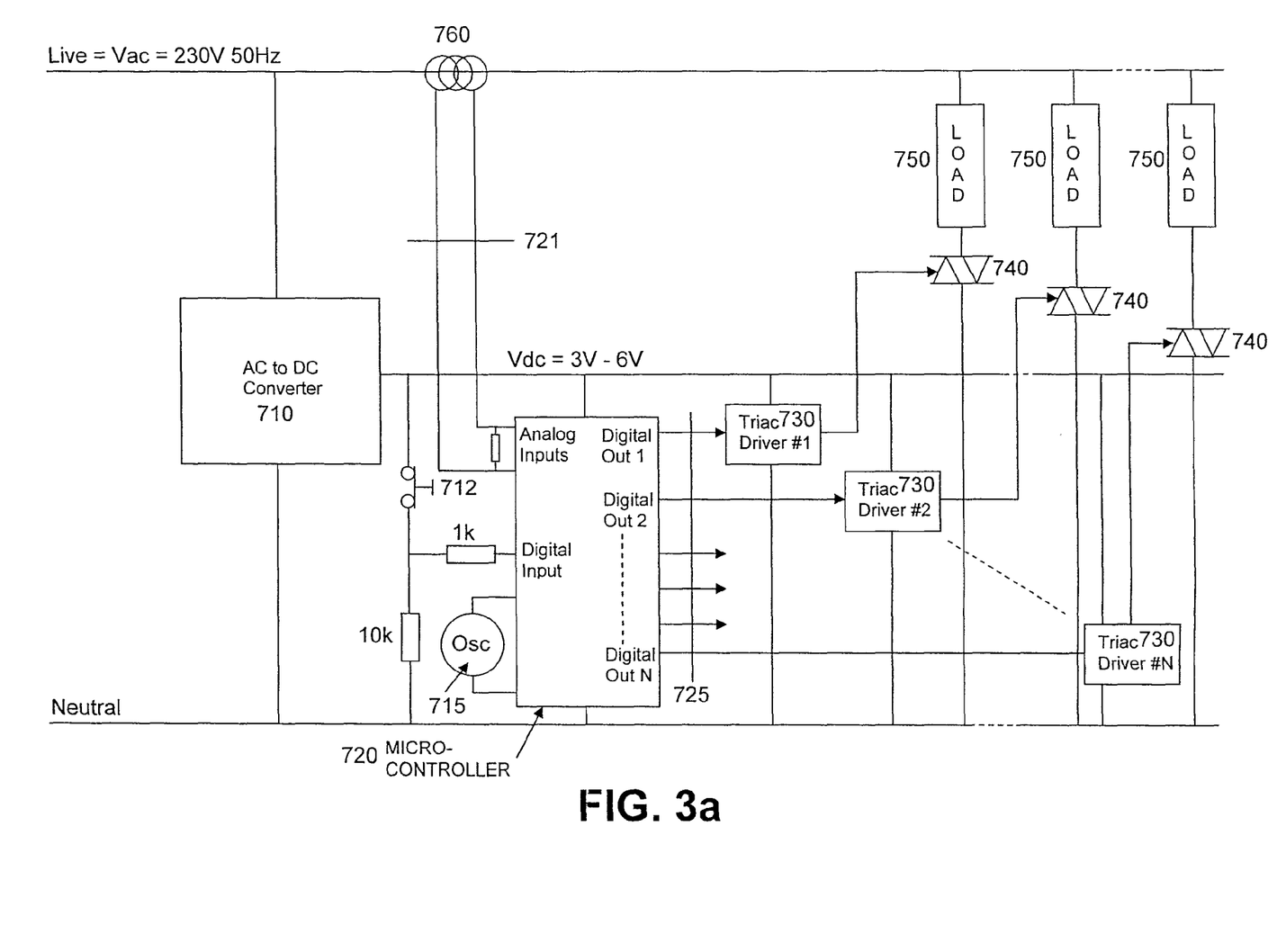
FIG. 3a shows a more detailed view of one embodiment of the control system of FIG. 1, making use of a detection coil based current sensor.
Figure 3B:
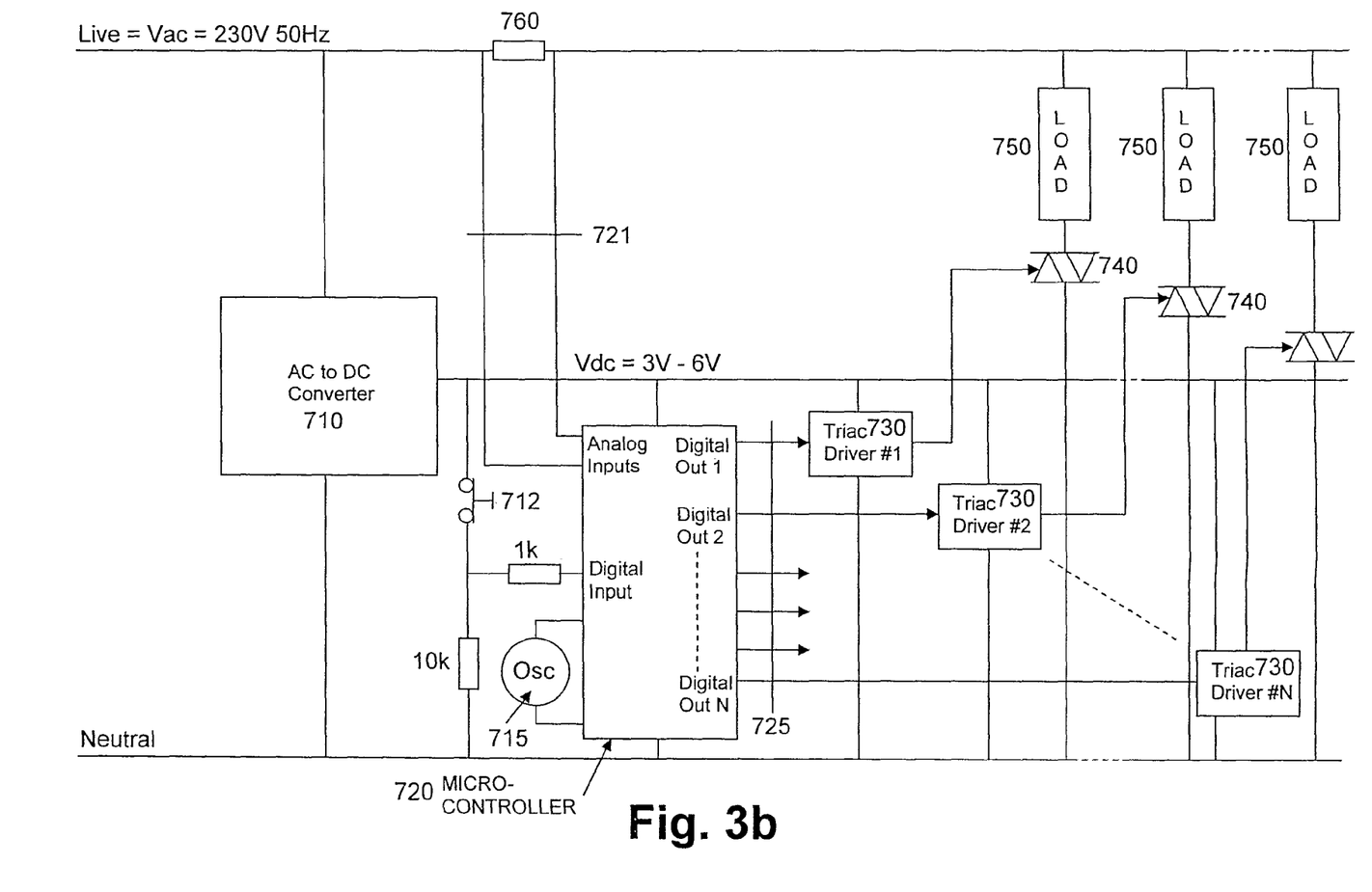
FIG. 3b shows an alternative embodiment of the control system of FIG. 1, making use of a resistor based current sensor.

FIG. 3a shows one embodiment of the controller 7. In this embodiment, the controller 7 comprises an AC to DC converter circuit 710, a microcontroller 720, driver circuits 730 for each triac 740 used to drive the load 750 formed by the resistance of the water across the electrodes, and a current detector 760 with a series resistor.

The AC to DC converter circuit 710 converts the mains AC voltage input into the kettle 1 into a constant DC voltage of sufficient size to operate the remaining components of the controller 7. For example, this DC voltage may be between 3 and 6 volts.

The microcontroller 720 is powered off the DC voltage outputted from the AC to DC converter 710. The microcontroller 720 has analog inputs 721, for receiving a signal from the current detector 760. Equally, a specialised circuit could be used to output a digital and analogue signal to the controller. The microcontroller 720 samples these analog inputs regularly to derive the current flowing through the wire carrying the AC power supplying the electrodes 2. The sampling rate is user definable, but must be sufficiently rapid to ensure the kettle 1 can react quickly enough to any changes in current, in order to maintain safety.

The microcontroller 720 has a number of digital outputs 725. There is one digital output 725 used per triac 740. The digital outputs 725 are not normally directly connected to the triacs 740 and instead they feed into triac drivers 730. The drivers may be a discrete device or a circuit. The use of triac drivers 730 ensures the signal received at the controlling input of the triac 740 is sufficient to operate the triacs 740. Furthermore, it serves to provide some isolation between the low power control circuit, and the high power heating circuit, for safety reasons.

The microcontroller 720 may require an oscillator 715 to set the frequency of operation of the microcontroller 720. This is typically a crystal oscillator of a few MHz, however, it is dependent on the type of microcontroller 720 used.

The microcontroller 720 is programmed to detect the current flowing through the water being heated, and to switch in or out different electrodes 2, according to whether the current must be increased or decreased. Operation of the microcontroller 720 is started using a simple switch 712 and resistor divider network connected to a digital input of the microcontroller 720, suitable to provide the required high or low voltage needed by the microcontroller 720.

In general, the controller 7 operates by switching on the electrode that provides the highest resistance (i.e. giving the lowest current), measuring the current flowing through the electrodes 2, and then switching on further electrodes 2, until the maximum current is flowing through the water. Since switching on different electrodes 2 alters the resistance across the electrodes 2 by a certain amount, different combinations of electrodes 2 will give difference total resistances. By using binary addition of the electrodes 2, the combinations can increase the resistance smoothly over the entire range.

Figure 4:
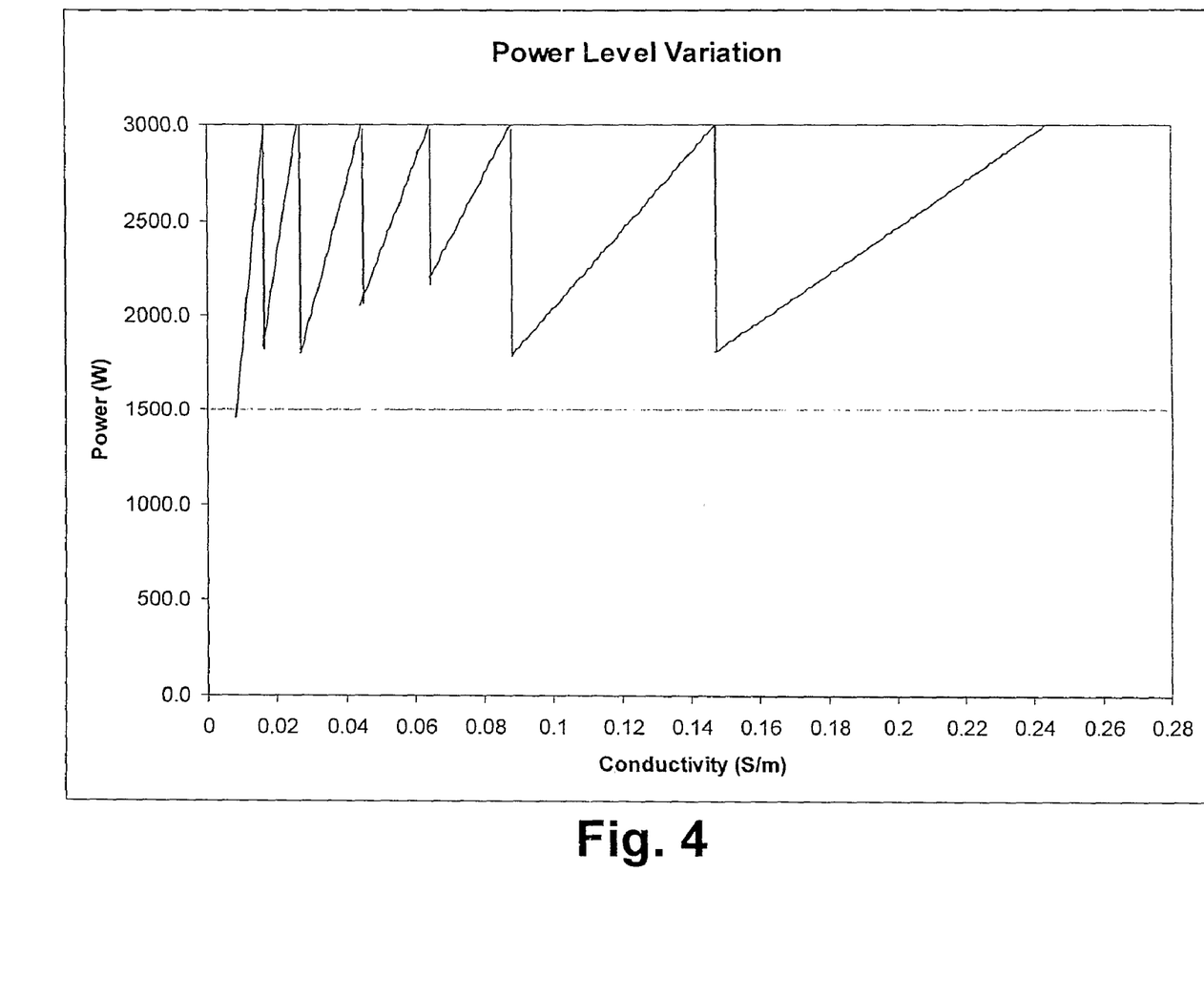
FIG. 4 shows a graph of power used by the kettle against conductivity of the water, as different electrodes are switched on and off.

FIG. 4 shows a graph of power used by the described kettle 1 against conductivity of the fluid being heated, as different combinations of electrodes 2 are switched on or off.

If, at any stage, the current drawn goes above the maximum, then the previous electrode combination will instead be selected. In the preferred embodiment, the electrodes 2 are switched in the preferred order of highest resistance, passing through binary addition of each electrode of increasing size, until finally all electrodes 2 are on. For example, the switching order may be A only, B only, C only, D only, A+B, A+C, etc, up to A+B+C+D.

The conductivity of the fluid between the electrodes will vary as the fluid heats up, so that the electrode combinations in use will change. Moreover, as boiling initiates in the water between the electrodes, and bubbles of steam form, the resistance of the water between the electrodes will increase as the bubbles reduce the conductivity. This resistance increase will occur rapidly at the onset of boiling and thus can be used as a signal to detect the onset of boiling. A rapid resistance change can be detected electronically and used as a signal to switch off the kettle 1 as boiling commences.

Numerous safety devices may be incorporated in a device according to the present invention to prevent accidental contact by the user with the fluid when the device is in use, or to cut off electrical supply to the kettle in the case of certain actions occurring, for example pouring of the kettle. These include:

A means of making and breaking the electrical supply to the live or neutral electrodes dependent upon whether the lid 5 is closed or not, so that an electric circuit passes through the fluid only when the vessel lid 5 is fitted correctly. This may typically be in the form of a switch 10 that breaks contact between the neutral line and the neutral electrodes when the lid is opened, for example to fill the vessel up with more fluid. This will prevent accidental contact between the vessel operator and the electrodes 2 or fluid within the vessel 1 while the lid 5 is open.

The device should also comprise a metallic mesh on the output of the kettle spout, which is connected to the earth line 14 or to an additional current sensing system. This device can then act as both a physical barrier to entry of the kettle 1 by such things as a user's fingers, and can also earth any water as is passes across the mesh. Furthermore, this mesh can act as a particulate filter.

An earthed conductor ring 13 located around the rim of the lid 5 or top of the kettle 1, also for earthing the possibly electrified water, for example if the kettle 1 is very full and the boiling action is forcing some water out of the lid 5.

A tilt switch 12 may also be incorporated, if required, which will cut the electrical power to the kettle 1 when it is tilted, for example to pour out the water. This will prevent water being poured out of the kettle 1 whilst electrical power is connected.

Electrochemical gas generation during normal operation of the kettle 1 of the present invention will be very small. In any case, any gases that are produced during the heating process will become mixed with the water vapour or steam produced by the hot or boiling water and will then be dispersed into the surrounding environment, thus no significant build-up of gas will occur.

Alternative arrangements for the electrodes 2 in the device according to the present invention include vertical electrodes 2 in a grid formation or in rows, rather than the concentric ring formation described above, and parallel electrodes 2 in a horizontal orientation.

Where the electrodes 2 are formed from parallel electrodes in a horizontal orientation, typically the live electrode may be a set of solid conductive plates located across the base of the heating vessel, with the neutral electrode being formed from one or more wires, or a wire meshes located above the live electrode plates.

Using a wire mesh for the neutral electrode makes the process of applying coatings to the electrode, so as to improve its performance as an electrode material, easier.

Such coatings may include platinum, or doped diamond coatings. The use of a perforated or mesh based neutral electrode permits any gases evolved to rise up out from between the electrodes 2, and also allows the water to circulate around the kettle 1 more freely, by natural convection, thus giving a more uniform heat distribution in the water in the kettle 1, prevented boiling from occurring in localised regions in the kettle, and hence ensuring the silent operation of the kettle. Suitable dimensions for such horizontal electrodes of an ohmically heated, silent kettle are 100 mm diameter plates, with 6 mm diameter perforations, separated by a distance of 15 mm.

Whilst the above has been described in terms of heating potable water in a domestic kettle, the present invention can equally be used to heat any electrically conductive liquid whilst avoiding noise generation and precipitate formation. Furthermore, the present invention can be used to heat potable water in devices other than kettles, such as in-line water heaters, coffee machines, large catering water heaters, washing machines, dishwashers and showers. Furthermore, where the heated water is not for human consumption, the water may be non potable grade water. The technique will be most beneficial in systems where furring of the equipment, including pipes, is highly undesirable due to the cost and labour attached to replacing equipment that has furred up to a point that it is no longer serviceable.

The invention claimed is:

1. A domestic water heater, comprising:
   at least three electrodes for immersion in the water; and
   a controller adapted to selectively energise the electrodes in at least two different combinations,
   wherein each different combination of electrodes results in a different total fluid resistance being observed across the electrodes, and
   wherein the controller is further adapted to increase the resistance presented between active electrodes by switching in suitable electrode pair combinations in response to a increase in the measured current and to decrease the resistance presented between active electrodes in response to a decrease in the measured current.

2. The apparatus of claim 1, further comprising a power supply, and wherein the controller is adapted to energise one or more of the plurality of electrodes by activating switches separately connecting at least two of the electrodes to the power supply.

3. The apparatus of claim 2, further comprising a current detector arranged to detect the total electrode current, and wherein the controller is further adapted to activate said switches in dependence upon the detected current.

4. The apparatus of claim 2, wherein the plurality of electrodes comprise a first and second group of electrodes, the first group of electrodes being connected to a first terminal of said power supply, and each of the second group of electrodes being connected to a second terminal of the power supply via a switch.

5. The apparatus of claim 4, wherein each of the first group of electrodes is connected to the first terminal of said power supply via a switch.

6. The apparatus of claim 4, wherein the first terminal of the power supply is a neutral terminal and the second terminal is a live terminal.

7. The apparatus of claim 4, further comprising an electrically insulated vessel for containing the fluid to be heated, wherein the plurality of electrodes are spatially arranged with predetermined gaps between the plurality of electrodes, and wherein the predetermined gaps between different ones of the electrodes are different sizes.

8. The apparatus of claim 1, wherein the electrodes are formed from vertically extending plates.

9. The apparatus of claim 1, wherein the electrodes are substantially parallel.

10. The apparatus of claim 1, wherein the electrodes are formed from carbon or carbon containing media.

11. The apparatus of claim 10, wherein the electrodes are formed from compressed exfoliated carbon.

12. The apparatus of claim 10, wherein the electrodes are formed from a polymer and carbon mixture.

13. The apparatus of claim 1, wherein the plurality of electrodes are arranged as a plurality of concentric rings, arranged about a central rod.

14. The apparatus of claim 13, wherein alternate rings are from the same group of electrodes.

15. The apparatus of claim 13, wherein alternate rings are of differing heights.

16. The apparatus of claim, 1 further comprising a tilt switch arranged to isolate the power supply means from the plurality of electrodes when the tilt switch detects the apparatus is tilted.

17. The apparatus of claim 1, further comprising:
   a lid; and
   a switch, mechanically operable by the opening of said lid, for isolating the power supply means from said electrodes when the lid is opened.

18. The apparatus of claim 17, further comprising a handle, said handle comprising connecting means, for connecting said switch to said power supply.

19. The apparatus of claim 1, wherein the controller comprises a microcontroller adapted to received an input indicative of the electrode current from the current detector and to provide a controlling output to one or more of the switches, dependent on the electrode current drawn.

20. The apparatus of claim 1, further comprising a conductor located around the top of said vessel, below said lid, wherein the conductor is electrically connected to an earth line of a power supply.

21. The apparatus of claim 1, the vessel further comprising a spout and a spout covering mesh, wherein the spout covering mesh is connected to the earth of the power supply and is capable of allowing the heated water to pass through when the heating apparatus is tilted substantially off vertical.

22. The apparatus of claim 1, wherein the switches are semiconductor switches and the controller operates said semiconductor switches using a driver circuit.

23. The apparatus of claim 22, wherein the semiconductor switches are triacs.

24. The apparatus of claim 22, wherein the semiconductor switches are thermally coupled to the vessel base.

25. A domestic kettle comprising the apparatus of claim 1.

26. The apparatus of claim 1, wherein the water being heated is potable water.

27. A method of heating domestic potable water, the method comprising:
   immersing at least three electrodes in the fluid to be heated;
   selectively energising the electrodes in at least two different combinations and increasing the resistance presented between active electrodes by switching in suitable electrode pair combinations in response to an increase in the measured current and to decrease the resistance presented between active electrodes to a decrease in the measured current.

28. The method of claim 27, further comprising the steps of:
   measuring a total electrode current; and
   activating said switches in dependence upon said measured current.

29. The method of claim 27, wherein the step of increasing the resistance presented between active electrodes is achieved by binary addition of the energisation of the different electrodes.

30. The method of claim 29, further including the step of returning to a previous combination of energised electrodes if the measured total electrode current exceeds a predetermined level.

31. The method of claim 27, further including the step of disconnecting the electrodes from the power supply if the current measured decreases rapidly as a result of the fluid starting boiling.

* * * * *